United States Patent
Jewell

(10) Patent No.: US 6,826,850 B2
(45) Date of Patent: Dec. 7, 2004

(54) ANIMAL DRYER AND METHOD FOR USE THEREOF

(76) Inventor: Connie J. Jewell, 1805 S. Colfax Ave., Benton Harbor, MI (US) 49022

(*) Notice: Subject to any disclaimer, the term of this patent is extended or adjusted under 35 U.S.C. 154(b) by 0 days.

(21) Appl. No.: 10/340,696

(22) Filed: Jan. 10, 2003

(65) Prior Publication Data
US 2004/0025365 A1 Feb. 12, 2004

Related U.S. Application Data
(60) Provisional application No. 60/401,967, filed on Aug. 8, 2002.

(51) Int. Cl.[7] .............................................. F26B 19/00
(52) U.S. Cl. ............................. 34/222; 34/202; 34/232
(58) Field of Search ......................... 34/227, 234, 201, 34/202, 218, 232, 222

(56) References Cited

U.S. PATENT DOCUMENTS

| | | | |
|---|---|---|---|
| 1,991,950 A | | 2/1935 | Martin |
| 2,027,694 A | | 1/1936 | List et al. |
| 4,314,410 A | * | 2/1982 | Nichols ......................... 34/202 |
| 4,559,903 A | * | 12/1985 | Bloom et al. ................ 119/416 |
| 4,977,690 A | | 12/1990 | Davis, Jr. |
| 5,025,572 A | * | 6/1991 | Cordier ......................... 34/202 |
| 5,180,330 A | * | 1/1993 | Delepierre et al. ............ 454/64 |
| 5,283,962 A | * | 2/1994 | Humann ........................ 34/202 |
| 6,050,000 A | * | 4/2000 | Curzon ......................... 34/572 |
| 6,305,325 B1 | | 10/2001 | Sullivan |
| 6,318,295 B1 | * | 11/2001 | Wade ........................... 119/500 |

FOREIGN PATENT DOCUMENTS

JP 03287435 A * 12/1991

* cited by examiner

Primary Examiner—Ira S. Lazarus
Assistant Examiner—Kathryn S. O'Malley
(74) Attorney, Agent, or Firm—Neal, Gerber & Eisenberg, LLP

(57) ABSTRACT

An animal dryer comprises an animal receiving chamber, a door member and an air providing member. The animal receiving chamber includes a first end portion, a second end portion and at least three side portions. The second end portion is disposed opposite the first end portion. The door member is disposed within one of the first or second end portions of the animal receiving chamber. The air providing member is either attached to one of the first or second end portions of the animal receiving chamber or disposed around the outside of at least one of the side portions of the animal receiving chamber.

3 Claims, 3 Drawing Sheets

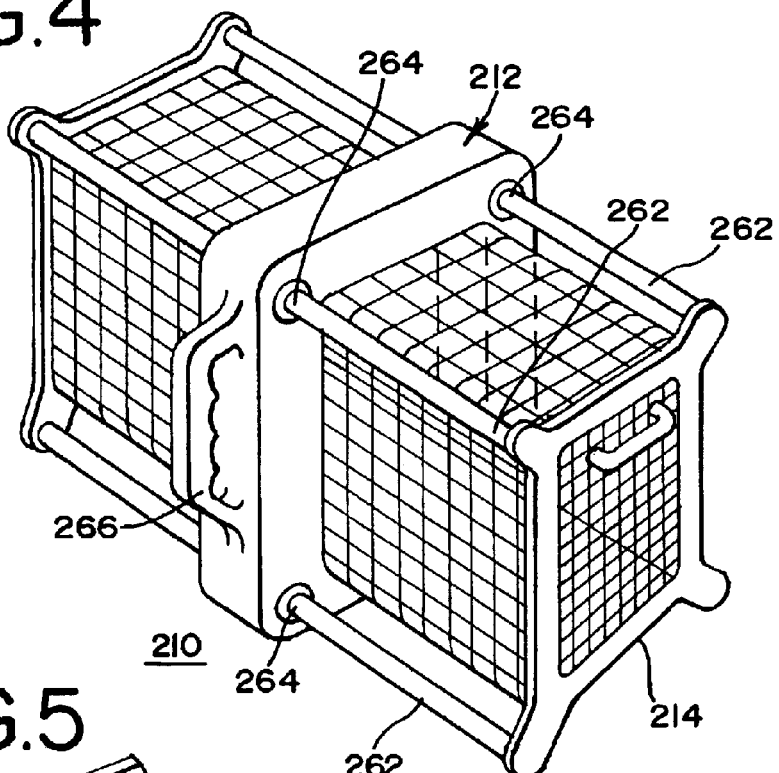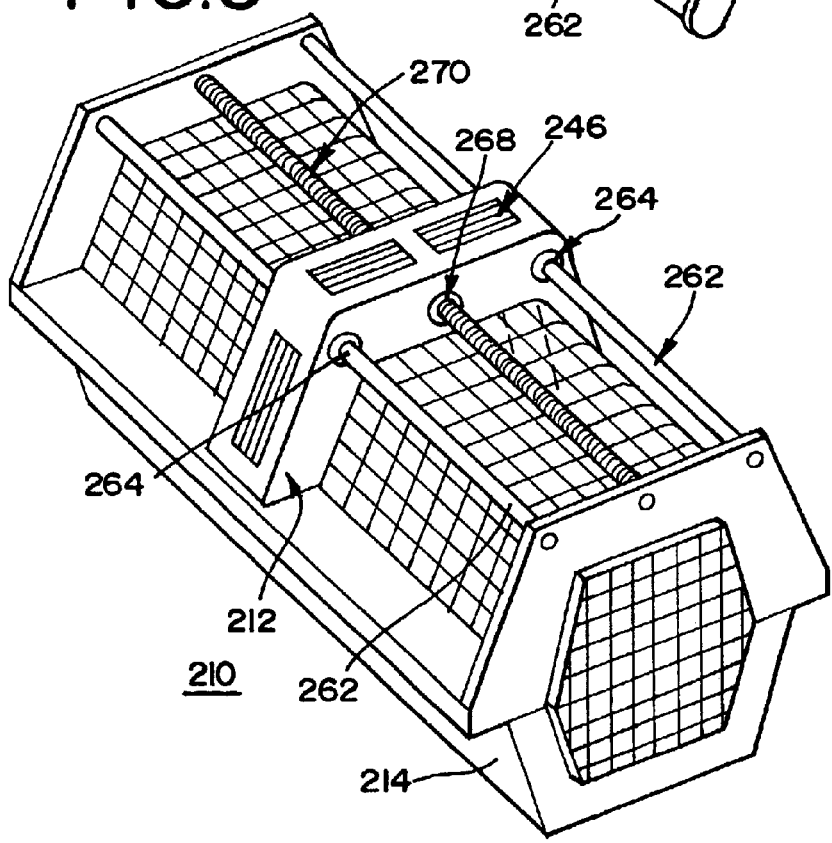

ANIMAL DRYER AND METHOD FOR USE THEREOF

This application claims the benefit of Provisional Application No. 60/401,967, filed Aug. 8, 2002.

FIELD OF THE INVENTION

The present invention generally relates to devices for drying, both by means of forcing water away from an intended object as well as by evaporation. More particularly, the invention described herein relates to an apparatus for drying animals, by means of forced and heated air, and a method for use thereof.

BACKGROUND OF THE INVENTION

Currently, there are a multitude of products directed towards the drying of various objects, whether animate or inanimate. Of particular importance to the present invention are instances in which the object is an animal such as a pet, another domesticated animal or livestock. Thus, the present invention focuses on devices that dry the hair of pets (in addition to other domesticated animals and livestock). Generally, such devices are used in preparation of the animals for shows and competitions. However, other applications of such dryers may include pet owners using them merely to dry the animal after giving the animal a bath.

One example of an animal dryer is disclosed in Sullivan, U.S. Pat. No. 6,305,325. Sullivan discloses a livestock blow dryer for drying livestock prior to showing the animals at competitions. The livestock blow dryer disclosed in Sullivan includes a blower housing having two blower motors for blowing air through an outlet opening. The livestock blow dryer also includes a filter cartridge to filter the air as it exits the outlet opening. Finally, the livestock blow dryer includes a frusto-conical nozzle adapted to cover the outlet opening; the end of the nozzle itself having a holding member for optionally attaching a hose to the nozzle.

An additional example is disclosed in Davis, Jr., U.S. Pat. No. 4,977,690. The invention disclosed in Davis, Jr. is a dryer with blower-heated air and flow recirculation. More specifically, the heat for blow-drying the hair of an animal is generated from the cooling of a motor and from fluid friction due to air being forced through passageways within the dryer. A blower forces air through the motor where the air is heated and then discharged into a pressurized section of the dryer enclosure. A portion of this air is then recirculated back, while the remainder is discharged through an air hose and used to dry the animal.

Although drying devices, such as those discussed immediately above, have been in existence for an extended period of time, such devices also suffer from a number of disadvantages. For instance, efficiency has been a major problem. Most, if not all, animal drying devices do not provide for a means for keeping the object steady or stable during the drying process; thus, drying an animal may take a longer period of time than is necessary. Additionally, portability has been a problem as well. This problem primarily comes into play with smaller objects, but nevertheless portability is still an issue.

There is therefore a need for a novel animal dryer which can not only perform the function of drying an object, but also to overcome the disadvantages stated herein above.

SUMMARY OF THE INVENTION

The present invention overcomes the above-stated disadvantages by providing an efficient, portable animal dryer and method for use thereof. In one embodiment, an animal dryer comprises an animal receiving chamber, a door member and an air providing member. In this embodiment, the animal receiving chamber includes a first end portion and a second end portion. The second end portion is disposed opposite the first end portion. The door member is disposed within one of the first or second end portions of the animal receiving chamber. Finally, the air providing member is also attached to one of the first or second end portions of the animal receiving chamber.

In a second embodiment, an animal dryer comprises an animal receiving chamber, a door member and an air providing member. In this embodiment, the animal receiving chamber an animal receiving chamber includes an end portion and at least three side portions. The door member is disposed within the end portion of the animal receiving chamber. Finally, the air providing member is disposed around the outside of at least one of the side portions of the animal receiving chamber.

In operation, and to dry an animal, first, an animal is placed within the animal receiving chamber of the animal dryer. The door member is closed, thereby securing the animal within the animal receiving chamber of the animal dryer. Air is generated from an air providing member, and circulated around (or directed towards) the animal.

These and other advantages of the present invention will be further understood and appreciated upon consideration of the following detailed description of embodiments of the invention taken in conjunction with the drawings, in which:

BRIEF DESCRIPTION OF THE DRAWINGS

FIG. 4 is a perspective view of another embodiment of an animal dryer, developed, made and used in accordance with the present invention; and FIG. 5 is a perspective view of additional embodiment of an animal dryer, developed, made and used in accordance with the present invention.

DETAILED DESCRIPTION OF THE PRESENTLY-PREFERRED EMBODIMENTS

FIGS. 1–5 illustrate embodiments of an animal dryer comprising an animal receiving chamber, an air providing member and a door member.

Figure 1:
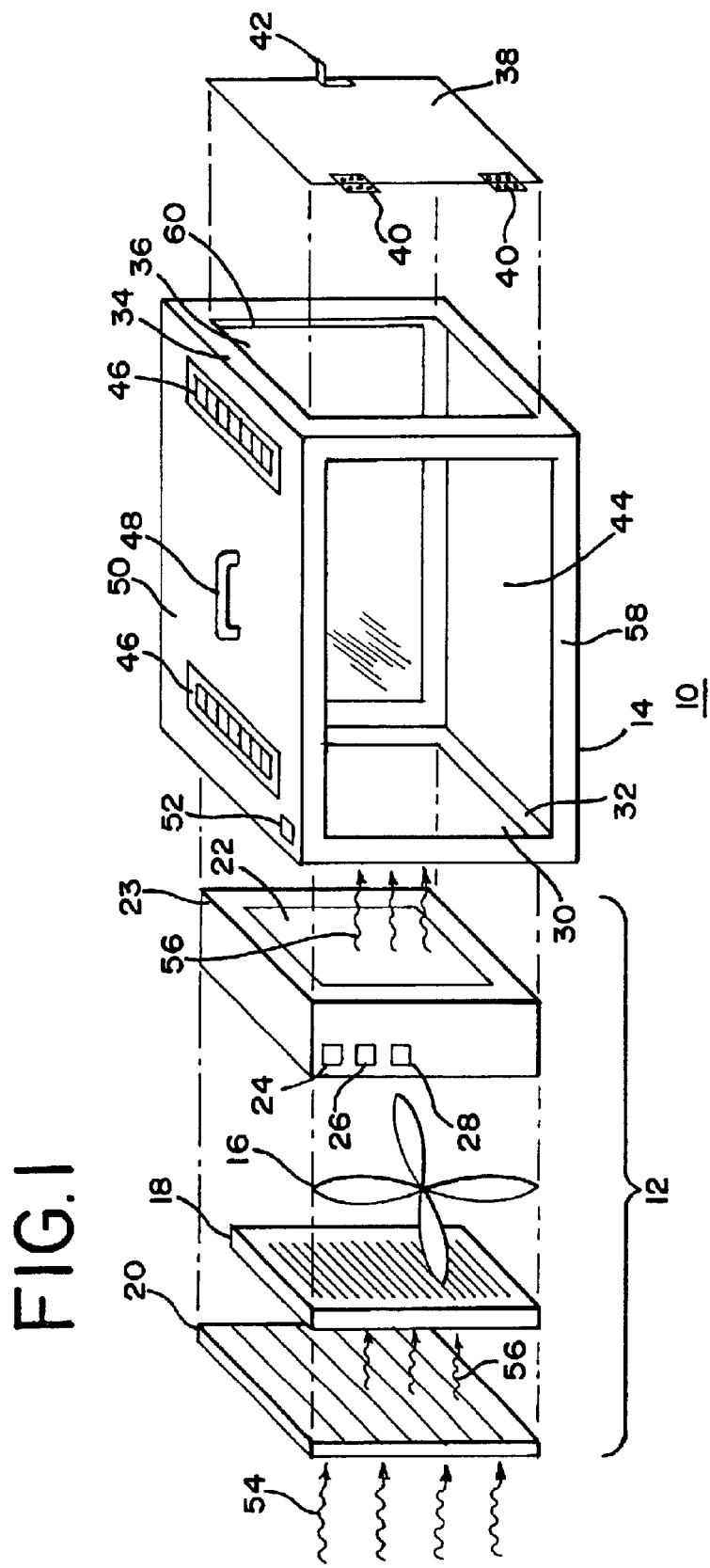
FIG. 1 is an exploded view of one embodiment of an animal dryer, developed, made and used in accordance with the present invention.

FIG. 1 shows an exploded view of one embodiment of animal dryer 10. Preferably, air providing member 12 forms one end of animal dryer 10. In the embodiment shown, air providing member 12 is attached to one end 32 of animal receiving chamber 14, although alternative embodiments are contemplated, such as where air providing member 12 may reside within (partially or completely) animal receiving chamber 14. Attachment of air providing member 12 to animal receiving member 14 may be by any currently-known means (means not shown), including, for example, screws, nuts-and-bolts, spot welds, adhesives, slots, etc.

The embodiment of air providing member 12, shown in FIG. 1, comprises fan 16 and heating element 18. Preferably, fan 16 and heating element 18, as used in the present invention, are commonly-known electrical devices. Thus, animal dryer 10 is preferably configured for alternate current (AC) usage (electrical cord not shown). However, any other device which can achieve the intended results of the combination of fan 16 and heating element 18 (i.e., to provide a force of warm air to animal receiving chamber 14) may be used, such as, for example, battery-, fuel- or solar-powered devices. To this end, it is also contemplated that, in line with the portability of the present invention, animal dryer 10 may be configured for direct current (DC) usage, such as through a motor vehicle-type adapter.

Air providing member 12 preferably also includes intake plate 20, disposed in one end of, and allowing for intake air to enter into, air providing member 12. Intake plate 20 is used for selectively allowing air to enter into air providing member 12, while not permitting certain particulates and other matter which may lessen the efficiency of air providing member 12. Additionally, intake plate 20 suffices to maintain the safety of air providing member, by prohibiting contact with fan 16 and/or heating element 18. Finally, intake plate 20 may be designed with aesthetics in mind, so as to give air providing member, as well as animal dryer 10, a pleasing appearance.

As shown in FIG. 1, intake plate 20 is comprised of a set of louvered slats. In lieu of louvered slats, air providing member 12 may include alternative means for selectively allowing intake air into air providing member 12, such as, for example, a mesh, a screen, a grating or similar lattice-type facing. Additionally, air providing member 12 has opening 22, disposed within and defined by end 23 of air providing member 12. Opening 22 is used for directing the exhaust air, after it has passed through the combination of fan 16 and heating element 18, into animal receiving chamber 14.

Preferably, air providing member 12 includes heating element control means 24, fan control means 26 and/or time control means 28. Heating element control means 24 may be any currently-known means for controlling the variables of heating element 18, including, for example, temperature, intensity, duration, etc. Thus, heating element control means 24 may function very much like a thermostat control device. Likewise, fan control means 26 may be any currently-known means for controlling the variables of fan 16, such as, for example, speed. Time control means 28, conversely, may be used to control the electrical, or other, power given to both heating element 18 and fan 16 of air providing member 12, including controlling not only when fan 16 and/or heating element 18 of air providing member 12 are on or off, but also the period of time that fan 16 and/or heating element 18 of air providing member 12 are powered. Time control means 28 may also comprise an automatic timer. It is contemplated that control means 24, 26, 28, discussed above, will also control power to the respective devices, such as, for example, by means of an on/off switch (not shown). It is additionally contemplated that control of power to the respective devices may be via automatic means or upon the occurrence of a specific event, such as, for example, the closing of door 38 (to be discussed below) or the placement of an animal inside animal receiving chamber 14 (such as by a weight-sensitive pad).

In operation, animal dryer 10 may operate as follows: After an animal is securely placed within animal receiving chamber 14, intake air 54 is received into air providing member 12, such as through intake plate 20. Air 56 is then heated by heating element 18 and forced, through opening 22, into animal receiving chamber 14 by the motion of fan 16. Alternatively, air 56 may be heated, by heating element 18, after passing through fan 16 (in which case, the placement of heating element 18 would be on the other side of fan 16).

In FIG. 1, animal receiving chamber 14 is shown as comprising a rectangular-shaped box with at least one opening. However, the size and shape of animal receiving chamber 14 may be of any dimension suitable for achieving the goal of the present invention. That is, various sizes are contemplated, having the capability of accommodating various-sized animals. Opening 30, defined by "back" end 32 of animal receiving chamber 14, is for receiving exhaust air forced out of air providing member 12 by the motion of fan 16 (through opening 22 of air providing member 12). Alternatively, opening 30 may be located on any side of animal receiving chamber 14.

As shown in FIG. 1, preferably, at opposite end 34 of animal receiving chamber 14 (i.e., the "front" end) is defined opening 36. Opening 36 is used for the ingress and egress of an animal into animal receiving chamber 14. Opening 36 may be further enhanced by the placement of door 38. In purpose, door 38 provides for the securement of the animal within animal receiving chamber 14.

In FIG. 1, it is shown that openings 30, 36 are on separate sides of animal receiving chamber 14. However, opening 36 may be incorporated into opening 30, may be placed on any other side of animal receiving chamber 14 or, possibly, on a combination of sides of animal receiving chamber 14. Such an incorporation would occur in the case in which air providing member 12 is disposed on the same end of animal receiving chamber 14 as door 38, in which case openings 30, 36 are one in the same.

As shown in FIG. 1, door 38 is preferably hinged to animal receiving chamber 14 through the use of at least one hinge 40. Additionally, door 38 may include latch member 42, which provides for the securement of door 38 to opening 36 of animal receiving chamber 14, thereby preventing the animal from exiting animal receiving chamber 14 during the drying process. Other similar means of securing door 38 to opening 36 of animal receiving chamber 14 may be used, so long as door 38 suffices to contain the animal within animal receiving chamber 14.

Also shown in FIG. 1, animal receiving chamber 14 may also have at least one window 44 disposed within any of the sides 58, 60 not containing door 38 and/or opening 36, although it is contemplated that the side containing door 38 may also include window 44. Preferably, windows 44 may be comprised of glass, plastic or any suitable transparent material. Animal receiving chamber 14 may also possess at least one vent 46 that provides a means for regulating the temperature, air pressure and/or air flow within animal receiving chamber 14. Vent 46 may be used to further assist in the regulation of the temperature, air pressure and/or air flow within animal receiving chamber 14. Additionally, vent 46 may possess an additional vent (not shown) for controlling the amount of air that is permitted to leave animal receiving chamber 14.

In this preferred embodiment, animal receiving chamber 14 may also possess carrying handle member 48. Preferably, carrying handle member 48 is disposed on top side 50 of animal receiving chamber 14, and is used to transport animal dryer 10 from location to location. Alternatively, carrying handle member 48 may also be disposed, in pairs, on sides of animal dryer 10. Preferably, carrying handle member 48 may comprise any type of known handle that allows for the quick and easy transportation of animal dryer 10. Additionally, animal receiving chamber 14 may include light (not shown), which is controllable by light switch 52. As is shown in FIG. 1, light switch 52 may be mounted on animal receiving chamber 14.

In its preferred embodiment, the frame of portable animal air dryer may be made of any type of lightweight material. Examples of similar lightweight materials include plastic, aluminum or titanium or any other similar metal, along with composites and other alloys of light metals.

Figure 2:
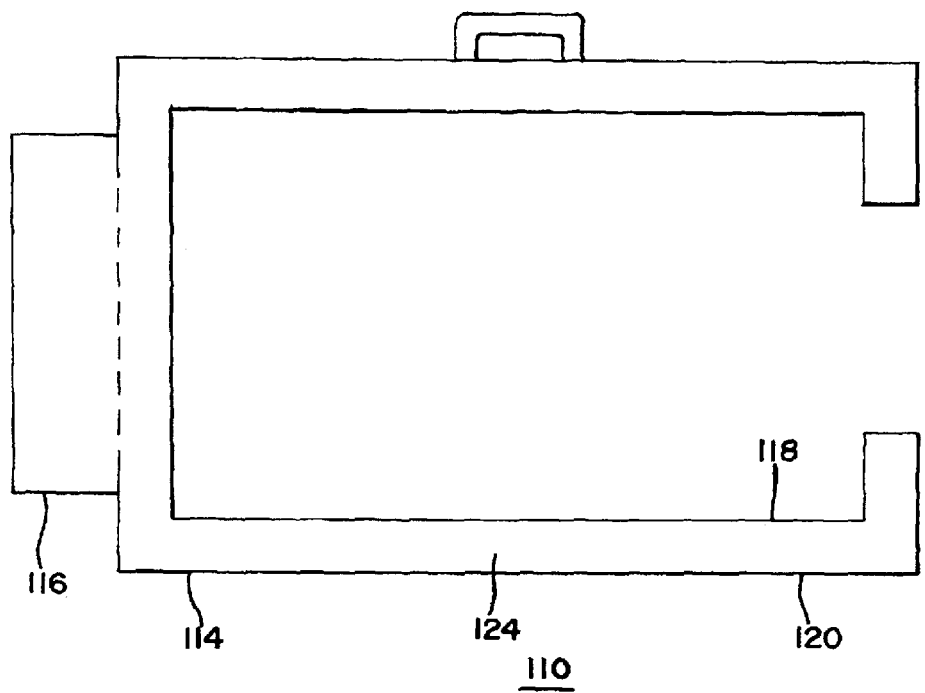
FIG. 2 is a cross-sectional view of another embodiment of an animal dryer, developed, made and used in accordance with the present invention.
Figure 3:
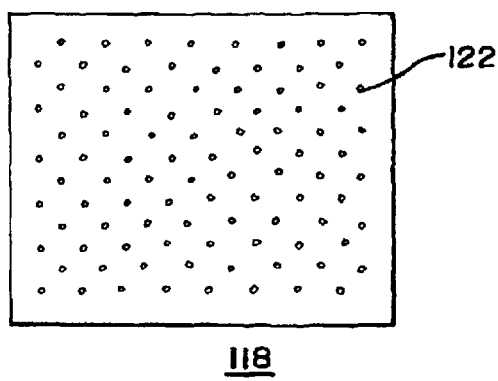
FIG. 3 is a front view of an inset of inner wall of FIG. 2.

In FIG. 2, a cross section of a second embodiment of animal dryer 110 is illustrated. In the second embodiment, animal receiving chamber 114 of animal dryer 110 is illustrated as comprising a "double-wall system." In the double-wall system of FIG. 2, animal receiving chamber 114 possesses inner wall 118 and outer wall 120. One primary difference between the double-wall system of FIG. 2 and the single-wall configuration of FIG. 1 concerns the presence of inner wall 118. In FIG. 2, inner wall 118 comprises a perforated mesh or lattice-type arrangement 122, as shown in the inset, FIG. 3. When exhaust air from air providing member 112 is forced into animal receiving chamber 114 of animal dryer 110, it is forced into airspace 124 created by the boundaries of inner wall 118 and outerwall 120. Since inner wall 118 is perforated, the exhaust air is forced into animal receiving chamber 114 via perforated mesh or lattice-type arrangement 122, as opposed to from a fan element, as is the case with the embodiment discussed with regards to the illustration of FIG. 1.

FIGS. 4 and 5 illustrate perspective views of a third embodiment of animal dryer 210. Referring to FIGS. 4 and 5, in this embodiment, animal receiving chamber 214 is shown as comprising a metallic-based fencing or grating. Additionally, air providing member 212, instead of being located at one end of animal receiving chamber 214, as is the case in FIGS. 1 and 2, is positioned in a manner such that it encompasses (or covers) a portion of at least one of the four lengthwise sides of animal receiving chamber 214. Preferably, enclosed within air providing member 212 is heating element 218 and fan 216 (elements not shown). Also as shown in FIGS. 4 and 5, air providing member 212 is disposed on at least one rail 262. That is, air providing member 212 contains at least one hole 264, through each of which rail 262 is inserted. As shown in FIGS. 4 and 5, rail 262 extends from one end of animal receiving chamber 214 to the other and is made of a material to allow air providing member 212 to slide back and forth, thereby allowing for the direction of the exhaust air onto the pet contained within animal receiving chamber 214.

FIG. 4 illustrates a variation of this embodiment of animal dryer 210. Specifically, in FIG. 4, air providing member 212 of animal dryer 210 may be moved manually and longitudinally vis a vis animal receiving chamber 214 by means of handle 266.

Alternatively, FIG. 5 illustrates a second, automated, variation of this embodiment of animal dryer 210. Specifically, in FIG. 5, air providing member 212 of animal dryer 210 may be moved longitudinally vis a vis animal receiving chamber 214 by means of a motor (not shown). Motor is preferably disposed inside air providing member 212 and rotates a drive nut 268 which moves air providing member 214 in both directions (back and forth) longitudinal vis a vis animal receiving chamber 214. Such motion may be effected through the use and implementation of various devices, such as, for example, rotating ban 270. In this regard, FIG. 4 illustrates a manual version of this embodiment of animal dryer 210, and FIG. 5 illustrates and automatic version of the embodiment.

Although preferred embodiments of the invention have been described in the foregoing description and illustrated in the accompanying drawings, the invention is not intended to be limited to the specific embodiments disclosed, but is capable of numerous changes, rearrangements and modifications without departing from the scope of the invention. Accordingly, the claims hereafter to the present invention are intended to encompass such changes, rearrangements and modifications as fall within the scope of the invention.

What is claimed is:

1. A portable animal dryer, comprising:
   an animal receiving chamber, the animal receiving chamber including a first end portion, two side portions and a top portion;
   two rail members, wherein one of the two rail members is disposed proximate to one of the two side portions, and the other of the two rail members is disposed proximate to the other of the two side portions;
   a door member disposed within the first end portion of the animal receiving chamber; and
   a moveable heated air providing member for drying an object secured within the animal receiving chamber by the door member, the moveable heated air providing member disposed on the two rail members and around the two side portions and the top portion of the animal receiving chamber;
   wherein the moveable heated air providing member traverses the length of the animal receiving chamber about the length of the two rail members.

2. The portable animal dryer as set forth in claim 1, wherein the moveable heated air providing member traverses the length of the animal receiving chamber automatically.

3. The portable animal dryer as set forth in claim 1, wherein the moveable heated air providing member traverses the length of the animal receiving chamber in a manual fashion.

* * * * *